(12) United States Patent
Mirji

(10) Patent No.: US 7,089,888 B2
(45) Date of Patent: Aug. 15, 2006

(54) DEVICE FOR PRODUCTION OF HYDROGEN FROM EFFLUENTS OF INTERNAL COMBUSTION ENGINES

(75) Inventor: Sanmati A. Mirji, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 11/027,487

(22) Filed: Dec. 30, 2004

(65) Prior Publication Data

US 2006/0144349 A1    Jul. 6, 2006

(51) Int. Cl.
    *F02B 75/12*    (2006.01)

(52) U.S. Cl. ............................. 123/1 A; 123/3

(58) Field of Classification Search ................ 123/1 A, 123/3
See application file for complete search history.

(56) References Cited

U.S. PATENT DOCUMENTS

| | | | |
|---|---|---|---|
| 4,104,191 A | | 8/1978 | Brocoff |
| 5,229,102 A | * | 7/1993 | Minet et al. ................. 423/652 |
| 6,079,373 A | * | 6/2000 | Kawamura ...................... 123/3 |
| 6,155,212 A | * | 12/2000 | McAlister ....................... 123/3 |
| 6,172,574 B1 | | 1/2001 | Sirito-Olivier |
| 6,506,510 B1 | | 1/2003 | Sioui et al. |
| 6,623,719 B1 | | 9/2003 | Lomax, Jr. et al. |
| 6,659,049 B1 | | 12/2003 | Zagaja et al. |

* cited by examiner

Primary Examiner—Tony M. Argenbright
Assistant Examiner—Katrina Harris
(74) Attorney, Agent, or Firm—Darby & Darby

(57) ABSTRACT

The present invention discloses a device for production of hydrogen from effluents of internal combustion engine, which comprises a steam generator, which derives thermal energy from the internal combustion engine and generates steam, the steam and the exhaust of the internal combustion engine being mixed in a reformer reactor and hydrogen gas being extracted through hydrogen separation membrane.

11 Claims, 1 Drawing Sheet

DEVICE FOR PRODUCTION OF HYDROGEN FROM EFFLUENTS OF INTERNAL COMBUSTION ENGINES

FIELD OF THE INVENTION

Figure 1:
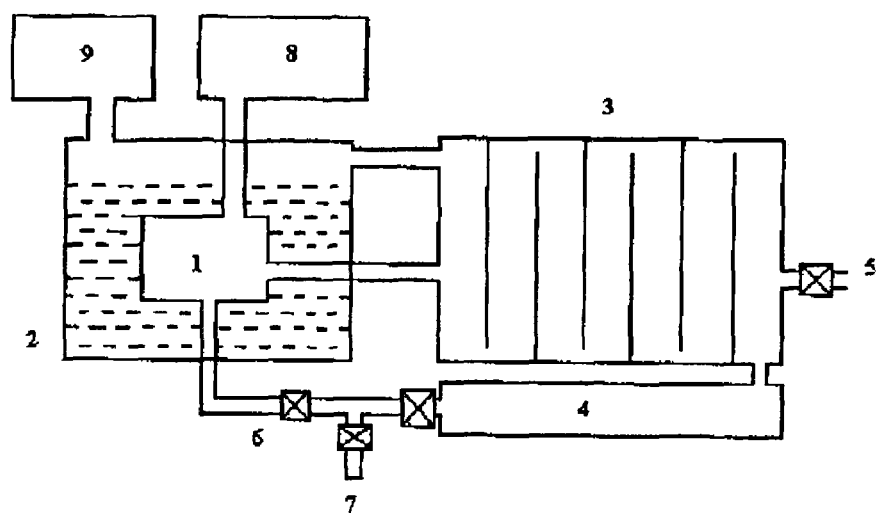

The present invention relates to a device for production of hydrogen from effluents of internal combustion engines. More particularly the present invention relates to generation of hydrogen for fuel cells and hydrogen based internal combustion engines by using unburnt/partially burned fuel and other organic compounds emitted from the exhaust of an internal combustion engine.

BACKGROUND OF THE INVENTION

Internal combustion engines burn fossil fuels such as petrol, diesel, kerosene, natural gas etc., and generate energy, which is used for transportation, pumping of liquids and for generating electricity. Fossil fuels are basically hydrocarbons, which contain predominantly carbon and hydrogen atoms. Burning of these fuels in internal combustion engines produces energy depending on efficiency of the engine, and a large quantity of un-burnt/partially burned fuel and other pollutants. 70% of air pollution in urban areas is due to burning of fossil fuels in internal combustion engines. Some of these pollutants are harmful and some are harmless. Harmful pollutants are CO, $NO_x$, $SO_x$, hydrocarbons, and volatile organic compounds. Some of the harmless pollutants are hydrogen, water vapor, oxygen and nitrogen. There are at least 200 different hydrocarbons that an internal combustion engine generates and emits at its exhaust. These include Methane ($CH_4$), Acetylene ($C_2H_2$), Ethylene ($C_2H_4$), Ethane ($C_2H_6$), Propane ($C_3H_6$), Benzene ($C_6H_6$), Toluene ($C_7H_8$) etc., It also generates other organic compounds such as Aldehyde ($CH_3CHO$), Ammonia ($NH_3$), Hydrogen Sulfide ($H_2S$), Formaldehyde (HCHO), Acetaldehyde ($CH_3CHO$), Ethyl alcohol ($C_2H_5OH$), Methyl alcohol ($CH_3OH$), Acetone ($CH_2COCH_3$), Formic acid (HCOOH), Nitric acid ($HNO_3$) etc. These these compounds are rich sources of hydrogen. Internal combustion engine emits 1–2% of hydrogen showing that the engine is capable of hydrogen generation.

An internal combustion engine does not use any hydrogen or carbon. It only burns higher order fuels (hexane ($C_6H_{14}$), heptane ($C_7H_{16}$), octane ($C_8H_{18}$) etc.,), breaks them and converts them into lower order hydrocarbons. All the quantity of hydrogen present in the fuel before burning will be there in the exhaust of the engine. In addition to that more hydrogen will be added in the engine from the water vapor from air, since the engine uses air for burning. Moreover, efficiency of the internal combustion engine is only in the range of 24–30%. Thus, 70–76% of the energy from the fossil fuels is wasted and a large portion thereof—about 36%, comes out as un-burnt or partially burned fuel from the exhaust. There will be therefore plenty of hydrogen in the exhaust of the internal combustion engine. Therefore, it is possible to generate a large quantity of hydrogen using internal combustion engine. Exhaust gas of internal combustion engines can be used to generate hydrogen gas for fuel cells as well as for running another internal combustion engine using hydrogen rich gas as fuel.

There are many attempts reported to generate hydrogen by various techniques such as steam reforming, CO reforming, water gas shift reaction, biomass reforming, photo biological water splitting etc. However, no attempt has been made to generate hydrogen from the exhaust gas of an internal combustion engine.

U.S. Pat. No. 6,659,049 discloses generation of hydrogen using a Venturi device coupled with exhaust stream of an internal combustion engine which generates water. Using this water and an electrolyzer, hydrogen is generated and used in the internal combustion engine to reduce the emission of pollutants. The drawbacks are the method is useful for the reduction of pollutants emission but it does not make use of large quantity of hydrocarbons the engine emits and moreover it does not stop emission of all the pollutants. The hydrogen so generated will not be of any use for fuel cells.

U.S. Pat. No. 6,623,719 teaches a hydrogen generation system from hydrocarbons such as natural gas, propane, liquefied petroleum gas (LPG), alcohols, naphtha and other hydrocarbon fuels by using steam reforming technique. The drawbacks are the method uses valuable chemicals (fuels) that have many use and does not use the waste hydrocarbons generated in the internal combustion engine.

U.S. Pat. No. 6,506,510 relates to hydrogen generation using methane-cracking reaction. The drawbacks are it uses the raw methane gas for hydrogen production and does not use the waste hydrocarbons generated in the internal combustion engine.

U.S. Pat. No. 6,172,574 teaches generation of hydrogen by steam reforming of methanol and carbon monoxide. The drawbacks are it uses raw methanol for hydrogen production and does not use waste hydrocarbons generated in the internal combustion engine.

U.S. Pat. No. 4,104,191 teaches generation of hydrogen from flue gases by mixing it with fuel and converting in the presence of oxidant. The drawbacks are it requires fuel and it does not make use of waste hydrocarbon generated by the internal combustion engine.

There are no reports or patents, which use waste hydrocarbons or hydrogen rich compounds generated by internal combustion engines for generation of hydrogen for fuel cells or for running another internal combustion engine with hydrogen as the fuel. The compounds generated by the internal combustion engine, which are rich in hydrogen, can be used for the generation of hydrogen.

OBJECTS OF THE INVENTION

The main object of the invention is to provide a novel device for production of hydrogen from effluents of internal combustion engines, which obviates the drawbacks as detailed in the prior art.

Another object of the invention is to use un-burnt/partially burned fuel/hydrocarbons and other hydrogen rich compounds emitted by internal combustion engines for production of hydrogen.

Another object of the invention is to eliminate all pollutants emitted by internal combustion engines by reforming them into useful and harmless chemicals.

Another object of the invention is to provide hydrogen to the internal combustion engine to assist in the combustion process and reduce emission of pollutants.

Another object of the invention is to provide pure hydrogen, which can be used for fuel cells, and hydrogen rich gas, which can be used for running another internal combustion engine with hydrogen rich gas as fuel.

BRIEF DESCRIPTION OF THE ACCOMPANYING DRAWING

In the drawing accompanying this specification, the FIGURE depicts a novel device for production of hydrogen from effluents of internal combustion engine.

SUMMARY OF THE INVENTION

Accordingly the present invention provides a device for production of hydrogen from effluents of an internal combustion engine comprising a steam generator built around the internal combustion engine, the steam generator and an exhaust of the internal combustion engine being connected to a reforming means, the reformer being provided with a first outlet connected to a hydrogen separation membrane and a second outlet for hydrogen rich fuel to be removed, the hydrogen separation membrane being provided with a first outlet and a second outlet to remove pure hydrogen.

In one embodiment of the invention, the steam generator is provided in close thermal contact with the internal combustion engine to use heat generated by the internal combustion engine for production of steam.

In another embodiment of the invention, the first outlet of the reformer is connected to the internal combustion engine for throughput of hydrogen rich fuel to the internal combustion engine for use as a fuel.

In another embodiment of the invention, the first outlet of hydrogen separation membrane is connected to an internal combustion engine to pass pure hydrogen thereto.

In another embodiment of the invention, the reformer is provided with a plurality of slots, each slot being provided with a different catalytic material to decompose hydrocarbons and hydrogen rich organic compounds entering the reformer from the internal combustion engine through the exhaust of the internal combustion engine.

In another embodiment of the invention, the second outlet of the hydrogen separation membrane is connected to a fuel cell.

The present invention also provides a method for the conversion of effluents from an internal combustion engine to hydrogen and/or hydrogen rich fuel, the method using a device comprising a steam generator built around the internal combustion engine, the steam generator and an exhaust of the internal combustion engine being connected to a reforming means, the reformer being provided with a first outlet connected to a hydrogen separation membrane and a second outlet for hydrogen rich gases to be removed, the hydrogen separation membrane being provided with a first outlet and a second outlet to remove pure hydrogen, the method comprising mixing steam generated in the steam generator with exhaust gas from the internal combustion engine in the reformer, the reformer being provided with slots containing different catalysts capable of reforming constituents of exhaust of the internal combustion engine to obtain hydrogen rich gases and pure hydrogen, releasing hydrogen rich gases from the first outlet of the reformer, passing pure hydrogen through the second outlet of the reformer to a hydrogen separation membrane to separate pure hydrogen.

In one embodiment of the invention, the steam is generated in the steam generator by using thermal energy generated during combustion in the internal combustion engine to boil water contained in a water tank in the steam generator.

In another embodiment of the invention, the mixture of steam and exhaust gas are subjected to steam reforming, partial oxidation, auto thermal, water shift, and decomposition reactions in the reformer to obtain $H_2$, $N_2$, $CO_2$ and $O_2$.

In another embodiment of the invention, the hydrogen rich gases taken out from the first outlet are mixed with air and throughput to an internal combustion engine for use as fuel.

In another embodiment of the invention, the pure hydrogen obtained from the first outlet of the hydrogen separation membrane is throughput to an internal combustion engine for use in combustion process and to reduce emission of pollutants.

DETAILED DESCRIPTION OF THE INVENTION

The present invention provides a device for production of hydrogen from effluents of internal combustion engine. The device is described with reference to the figure accompanying this specification. The internal combustion engine (1) has a steam generator (2) built around and in close thermal contact therewith. The exhaust of the internal combustion engine (1) and steam generator (2) are connected to a reformer (3) provided with a plurality of slots, different catalysts being provided in each slot. The reformer (3) is provided with a first outlet and a second outlet. The first outlet is connected to a hydrogen separation membrane (4) and the second outlet (5) emits hydrogen rich fuel. The hydrogen separation membrane (4) is provided with a first outlet and a second outlet. The first outlet (6) is connected can be connected to the same or another internal combustion engine (1) and the second outlet (7) emits pure hydrogen which can be used for fuel cells.

The steam generator (2) is constructed in close thermal contact with the internal combustion engine (1) to make use of the heat generated by the internal combustion engine (1) for the production of steam. The steam generator (2) and the exhaust of the internal combustion engine (1) are connected to a reformer (3) to generate hydrogen and to decompose other pollutants.

The reformer (3) has several slots, each slot is filled with different catalytic material dependant on the constituents of the exhaust gas from the internal combustion engine. The reformer results in the decomposition of hydrocarbons, hydrogen rich organic compounds and other compounds. The reformer (3) has two outlets, one outlet (5) gives hydrogen rich fuel, which can be used for running another internal combustion engine with hydrogen rich gas as the fuel. The reformer is also connected to a hydrogen separation membrane (4), which gives pure hydrogen. The outlet (6) of hydrogen separation membrane (4) is connected to the same or another internal combustion engine (1), to provide pure hydrogen to thereto in order to assist in the combustion process and reduce the emission of pollutants.

The second outlet (7) of the hydrogen separation membrane (4) which gives pure hydrogen can be connected to a fuel cell.

An internal combustion engine burns fossil fuels like petrol, diesel, kerosene, natural gas etc., and generates energy depending on the fuel efficiency of the engine. Most internal combustion engines available today have fuel efficiency in the range of 24–30%. Thus, the remaining 70–76% of fuel is not used for energy conversion. A large portion of such fuel—about 36%, is emitted from the exhaust of internal combustion engines as un-burnt/partially burned fuel or hydrocarbons. The exhaust of the engine also emits many organic compounds, nitrous oxides, sulfur oxides, acids, particulate matter, water vapor, hydrogen, oxygen and the like. Most of such compounds emitted in the exhaust are rich sources of hydrogen. Thus, the exhaust gases can be reformed to get hydrogen and hydrogen rich gases. Steam reforming is the well-known chemical process to produce hydrogen from hydrocarbons. The following reaction illustrates steam reforming.

$C_nH_m + nH_2O \rightarrow (n+m/2) H_2 + nCO$

The steam is produced in a steam generator built around the internal combustion engine and thermally in close contact with the engine so that it derives thermal energy from the engine for steam production. Approximately 30% of the energy produced by the internal combustion engine is wasted as heat energy. This energy is used for steam production. The steam and the exhaust of the internal combustion engine are mixed in the reformer, which has many slots; each slot is filled with different catalysts.

The above-mentioned steam reforming reaction takes place in the reformer. Some of the other reactions, which take place in the reformer are:

Partial oxidation; $C_nH_m + n/2 \ O_2 \rightarrow m/2 \ H_2 + nCO$

Auto thermal reforming: $C_nH_m + (n-a) H_2O + a/2 \ O_2 \rightarrow (n-a+m/2) H_2 + nCO$ Water gas shift reaction: $H_2O + CO \rightarrow H_2 + CO_2$ All these reactions produce hydrogen.

Other organic compounds can also be catalytically converted to get hydrogen for example:

Methanol can be decomposed using Cu, Zn—Cu-cement catalyst to get:

$CH_3OH \rightarrow CO + 2H_2$ $CO + H_2O \rightarrow CO_2 + H_2$

Similarly ethanol can be decomposed over Pd-catalyst to give:

$C_2H_5OH \rightarrow CH_4 + CO + H_2$ $CO + H_2O \rightarrow CO_2 + H_2$

Catalysts are also available to reduce NO or $NO_2$ to get:

NO (or $NO_2$) + CO $\rightarrow 1/2 N_2 + CO_2$

It is also possible to convert NO or $NO_2$ to $HNO_3$ (Nitric acid) using the reactions:

$NO + O \rightarrow NO_2$ $H_2O \rightarrow 2OH$ $OH + NO_2 \rightarrow HNO_3$

Similarly $SO_2$ and $SO_3$ can be converted to $H_2SO_3$ and $H_2SO_4$ using the reactions:

$SO_2 + H_2O \rightarrow H_2SO_3$ $SO_2 + O \rightarrow SO_3$ $SO_3 + H_2O \rightarrow H_2SO_4$ The exhaust gases are hot enough so heating of these gases is not required.

The reformer therefore produces hydrogen rich gases, which can be used to run another internal combustion engine. Hydrogen separation membrane can be used to extract pure hydrogen for fuel cells and a part of it can be fed back to the internal combustion engine because it is a well-known fact that the hydrogen assists the combustion process and increases the efficiency of the engine and reduces the pollutants emission.

The present invention resides in a novel apparatus to use waste exhaust gas of internal combustion engines for production of hydrogen and hydrogen rich gas thereby increasing the efficiency of the engine and using the fuel completely for energy generation. Hydrogen generation by using hydrocarbons, and other compounds, which are well known and well documented in the literature, can be used in this process as well.

The hydrogen generation method works in the following way. The internal combustion engine (1) burns fuel from fuel tank (8) and generates energy. The waste thermal energy of the internal combustion engine (1) is used to produce steam using steam generator (2) that boils water from the water tank (9) and generates steam. The exhaust gas from the internal combustion engine (1) and steam from steam generator (2) are mixed in the reformer (3). The steam reforming, partial oxidation, auto thermal, water shift, decomposition, and many such reactions take place in the reformer and produce gases like $H_2$, $N_2$, $CO_2$, $O_2$ and the like. Hydrogen rich gases are taken out from the outlet valve (5) and can be mixed with air and used for running another internal combustion engine. The pure hydrogen can be obtained by using hydrogen separation membrane (4). The outlet (7) gives pure hydrogen. The outlet (6) is used to supply a small percentage of hydrogen to the internal combustion engine (1), which helps in the combustion process and reduces the emission of pollutants.

Thus the invention provides a novel method and device for production of hydrogen from exhaust gases of an internal combustion engine.

An internal combustion engine is a chemical rector where the following reaction occurs:

Fuel+Air-------->Energy+Exhaust gas

Since the chemical reaction has to be balanced, all the hydrogen present in the mixture of fuel and air must be present in the exhaust gas. This shows that exhaust gas of an internal combustion engine is an important source of hydrogen required for fuel cell development. The maximum conversion efficiency of existing internal combustion engines is only about 30%. The remaining 70% energy is wasted. About 30% of energy is wasted as heat energy. In the present invention, this energy is used for the reformer.

While known hydrogen generation systems use raw fuel like methane, CNG, LPG, methanol and the like, the present invention uses only waste exhaust gas and waste heat generated by the internal combustion engine and is therefore economical and efficient.

The main advantages of the present invention are:
1) It generates hydrogen and hydrogen rich gas from the waste exhaust gas of the internal combustion engine.
2) It increases the efficiency of the internal combustion engine and decreases the emission of pollutants.
3) The hydrogen gas is useful for fuel cells and the hydrogen rich gas is useful for running another internal combustion engine
4) It stops the emission of pollutants from the internal combustion engine and converts them into useful and harmless gases.
5) It does not require any extra energy or power supply for the production of hydrogen.

We claim:

1. A device for production of hydrogen from effluents of an internal combustion engine comprising a steam generator built around the internal combustion engine, the steam generator and an exhaust of the internal combustion engine being connected to a reforming means, the reformer being provided with a first outlet connected to a hydrogen separation membrane and a second outlet for hydrogen rich fuel to be removed, the hydrogen separation membrane being provided with a first outlet and a second outlet to remove pure hydrogen.

2. A device as claimed in claim 1 wherein the steam generator is provided in close thermal contact with the internal combustion engine to use heat generated by the internal combustion engine for production of steam.

3. A device as claimed in claim 1 wherein the reformer is provided with a plurality of slots, each slot being provided with a different catalytic material to decompose hydrocarbons and hydrogen rich organic compounds entering the reformer from the internal combustion engine through the exhaust of the internal combustion engine.

4. A device as claimed in claim 1 wherein the first outlet of the reformer is connected to the internal combustion engine for throughput of hydrogen rich fuel to the internal combustion engine for use as a fuel.

5. A device as claimed in claim 1 wherein the first outlet of hydrogen separation membrane is connected to the internal combustion engine to throughput pure hydrogen thereto.

6. A device as claimed in claim 1 wherein the second outlet of hydrogen separation membrane is connected to a fuel cell.

7. A method for the conversion of effluents from an internal combustion engine to hydrogen and/or hydrogen rich fuel, the method using a device comprising a steam generator built around the internal combustion engine, the steam generator and an exhaust of the internal combustion engine being connected to a reforming means, the reformer being provided with a first outlet connected to a hydrogen separation membrane and a second outlet for hydrogen rich gases to be removed, the hydrogen separation membrane being provided with a first outlet and a second outlet to remove pure hydrogen, the method comprising mixing steam generated in the steam generator with exhaust gas from the internal combustion engine in the reformer, the reformer being provided with slots containing different catalysts capable of reforming constituents of exhaust of the internal combustion engine to obtain hydrogen rich gases and pure hydrogen, releasing hydrogen rich gases from the first outlet of the reformer, passing pure hydrogen through the second outlet of the reformer to a hydrogen separation membrane to separate pure hydrogen.

8. A method as claimed in claim 7 wherein the steam is generated in the steam generator by using thermal energy generated during combustion in the internal combustion engine to boil water contained in a water tank in the steam generator.

9. A method as claimed in claim 7 wherein the mixture of steam and exhaust gas are subjected to steam reforming, partial oxidation, auto thermal, water shift, and decomposition reactions in the reformer to obtain $H_2$, $N_2$, $CO_2$ and $O_2$.

10. A method as claimed in claim 7 wherein the hydrogen rich gases taken out from the first outlet are mixed with air and throughput to an internal combustion engine for use as fuel.

11. A method as claimed in claim 7 wherein the pure hydrogen obtained from the first outlet of the hydrogen separation membrane is throughput to an internal combustion engine for use in combustion process and to reduce emission of pollutants.

* * * * *